O. P. MORAN.

Seed-Planter.

No. 26,044. Patented Nov. 8. 1859.

Witnesses:
Robert M Cone
J K Green

Inventor:
Oliver P Moran

UNITED STATES PATENT OFFICE.

OLIVER P. MORAN, OF HAINESVILLE, MISSOURI.

IMPROVEMENT IN CORN-PLANTERS.

Specification forming part of Letters Patent No. 26,044, dated November 8, 1859.

*To all whom it may concern:*

Be it known that I, OLIVER P. MORAN, of Hainesville, in the county of Clinton and State of Missouri, have invented a new and Improved Corn-Planter; and I do hereby declare that the following is a full and exact description thereof, reference being had to the accompanying drawings, making part of this specification—

Figure 1:
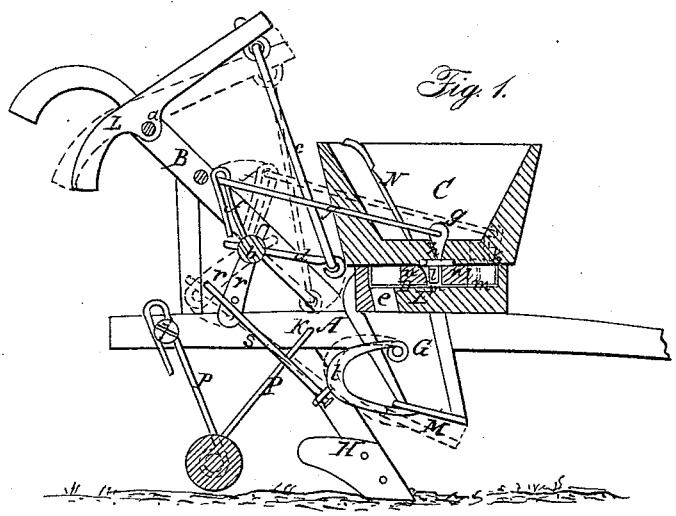
Figure 3:
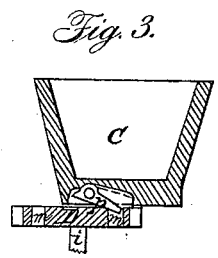
Figure 2:
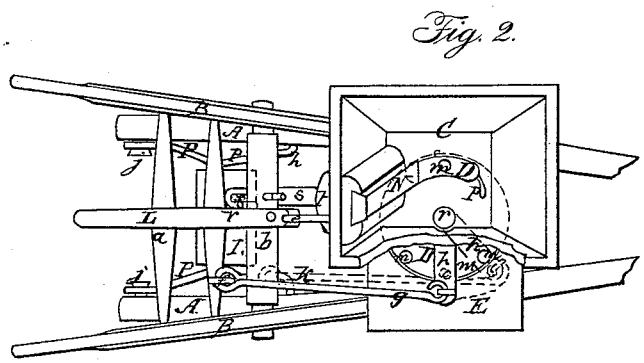
Figure 4:
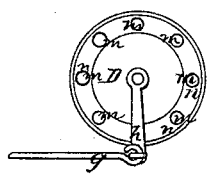

Figure 1 being a longitudinal vertical section of my improved corn-planter; Fig. 2, a plan thereof; Fig. 3, a vertical section of a part detached; Fig. 4, a plan of a part detached.

Like letters designate corresponding parts in all the figures.

The frame on which the parts are mounted is composed of two side pieces, A A, which are provided with and guided by two handles, B B, in any ordinary manner.

The seed-box C is situated on a flat transverse bar, E, which rests on the side pieces, A A, and in a circular cavity in the top of said bar E, beneath the seed-box, is the horizontal dropping wheel or disk D, which turns on a central pivot, $i$. A set of measuring-holes, $m$ $m$, is formed in the dropping-wheel at equal distances apart and from the center. A curved aperture, $o$, Fig. 2, concentric with the measuring-holes, and just large enough to expose only one or two of said holes at once, is made in the bottom of the seed-box C, substantially as shown, and in the rear end thereof rests a sliding strike, N, which keeps its place simply by the free action of its own weight, whereby the surplus grains are swept from the measuring-holes as the dropping-wheel is moved round. This arrangement of the narrow aperture $o$ in the bottom of the seed-box and of the strike N enables the grain to be distributed in the measuring-holes with accuracy and with scarcely any impediment to the turning of the dropping-wheel, since scarcely any weight of corn rests upon the wheel, except a few grains that fall loosely into the said cavity $o$.

On the pivot $i$ of the dropping-wheel D is also pivoted a vibratory arm, $h$, which projects outward over the wheel on the side which is not covered by the seed-box, as seen in Fig. 2. A pin, $l$, projects downward from this arm at just the proper distance from the center to enable it to enter successively all the measuring-holes $m$ $m$ in said dropping-wheel. The rear upper edges, $n$ $n$, of the holes $m$ $m$ are sloped or rounded, as shown most distinctly in Fig. 1, so that on drawing back the arm $h$ its pin $l$ will rise out of the holes by the wedge action of said edges. This shape of the measuring-holes does not injure their efficiency in distributing the corn. The front edges are abrupt, so that by pushing forward the arm $h$ the wheel will be moved round a distance sufficient to discharge one holeful of the grains into the aperture $l$, Fig. 1, through the bar E, and thence into a chamber, G, beneath. The successive vibrations of the arm $h$ to produce this discharge of grains are produced by the operator's vibrating a small thumb or hand lever, L, which is pivoted by a shaft, $a$, between the handles B B in such a position as to be reached by one hand without releasing the hold on the handle.

The intermediate connections between the lever L and the vibrating arm $h$ may be by any suitable rods and vibratory arms or their equivalents. In the drawings there are shown for the purpose the connecting-rods $c$ and $g$ and the vibratory arms $f$ and $d$ on a rock-shaft, $b$. A detent, $p$, Figs. 2 and 3, may be employed for retaining the dropping-wheel in place while shifting the arm $h$ from one hole $m$ to another. Thus by the use of the measuring-holes $m$ $m$ in connection with the concentric vibratory arm $h$ a completely effective and exact means of actuating the wheel is provided, almost without additional cost or complication.

Each set of grains, after being discharged into the chamber G, which extends downward as near to the ground as practicable, is retained till the very moment when the grains are to be dropped into the ground by means of a valve, M. This valve is so constructed and arranged as to act almost instantaneously at the proper moment from the movement of the hand-lever L, and on this account is termed the "instant valve." It is provided with a long, curved, weighted hinge, $t$, which is jointed to the sides of the chamber G at a considerable distance from and above the valve, substantially as represented in Fig. 1. By this arrangement the valve is opened directly away from the mouth of the chamber, and quickly, by a very little movement on its hinge, so that the grains are let out of the chamber almost at the moment that the operator touches the lever L. And the weight of the hinge $t$ shuts the valve automatically, and so slightly overbalances the weight of said valve that the smallest exertion or pressure of the hand at the lever L will open the valve. The connection is formed between the lever L and the hinge $t$ for opening the valve by means of an arm, $r$, on the rock-shaft $b$ and of the slotted connecting-rod or shackle-bar $s$, as shown. The slot in this connecting-rod is for the purpose of allowing a free action of the weighted hinge $t$ in shutting the valve without its being impeded by any failure to bring back the lever L to its proper position at once.

Before using the corn-planter the ground is to be cross furrowed or marked to indicate where the hills are to be located; and by the use of the above-described improvements the operator can, with his eye to guide him, when passing the cross-marks, by touching the hand-lever L at the proper moment, (which practice soon perfectly teaches,) plant the corn with exact and unerring regularity.

Suitable plows or drill-teeth, H, are arranged on each side, just behind the seed-box, for covering the corn. They also not only cultivate the land on each side of the rows, but leave slight furrows to drain off water during rains. Behind these plows, and centrally between them, a short roller, I, is employed for gaging the depth of planting and for pressing down and smoothing the earth above the hills. It is conveniently mounted in branched bearings P P, one branch being pivoted at $k$ and the other branch being adjustable at $j$ for regulating the height of the roller.

What I claim as my invention, and desire to secure by Letters Patent, is—

1. The combination of the curved concentric aperture $o$ in the bottom of the seed-box C with the sliding strike N and measuring-holes $m\ m$, for the purpose of charging said holes from the seed-box with the least possible weight upon and impediment to the motion of the dropping-wheel, as herein specified.

2. The combination of the concentric vibratory arm $h$ and projecting pin $l$ thereon with the measuring-holes $m\ m$, substantially as specified, for the purpose of imparting the proper movement to the dropping-wheel D.

3. The arrangement of the instant valve M upon the curved weighted hinge $t$, which is pivoted to the sides of the chamber G in a position nearly vertical over the valve, in combination with the slotted connecting-rod $s$, for the purpose of producing a superior quickness and delicacy of action on the valve, substantially as herein specified.

OLIVER P. MORAN.

Witnesses:
ROBERT McCORD,
J. R. GREEN.